US010424214B2

(12) United States Patent
Robichaud

(10) Patent No.: US 10,424,214 B2
(45) Date of Patent: Sep. 24, 2019

(54) STUDENT-CENTRIC LEARNING TOOL

(71) Applicant: Valere, Inc, Simsbury, CT (US)

(72) Inventor: Joan Robichaud, Simsbury, CT (US)

(73) Assignee: VALERE, INC, Simsbury, CT (US)

(*) Notice: Subject to any disclaimer, the term of this patent is extended or adjusted under 35 U.S.C. 154(b) by 171 days.

(21) Appl. No.: 15/161,516

(22) Filed: May 23, 2016

(65) Prior Publication Data
US 2017/0337835 A1 Nov. 23, 2017

(51) Int. Cl.
*G09B 7/00* (2006.01)
*G09B 7/02* (2006.01)
*H04L 29/08* (2006.01)
*G06F 21/10* (2013.01)

(52) U.S. Cl.
CPC .............. *G09B 7/02* (2013.01); *G06F 21/10* (2013.01); *H04L 67/306* (2013.01); *H04L 67/34* (2013.01); *G06F 2221/0713* (2013.01)

(58) Field of Classification Search
CPC .... G09B 5/00; G09B 5/02; G09B 7/02; G06F 3/048
See application file for complete search history.

(56) References Cited

U.S. PATENT DOCUMENTS

| | | | |
|---|---|---|---|
| 2004/0078225 A1* | 4/2004 | Schramm-Apple | G06F 19/324 705/2 |
| 2012/0231437 A1* | 9/2012 | Fakhrai | G09B 7/00 434/350 |
| 2012/0244510 A1* | 9/2012 | Watkins, Jr. | G09B 7/00 434/362 |
| 2014/0242565 A1* | 8/2014 | Abts | G09B 5/00 434/350 |

* cited by examiner

*Primary Examiner* — Peter R Egloff
(74) *Attorney, Agent, or Firm* — Cantor Colburn LLP

(57) ABSTRACT

An aspect of student-centric learning includes a processor and software modules executable by the processor. A first module is configured to receive, via a first template, time-sensitive data about elements of learning objectives with respect to students in a structured learning environment. The elements are exported into a second template of a second module and are classified by topic. A selectable indicator in the second template is associated with each topic. The second module is configured to receive, via the second template: time-sensitive data about one of the students with respect to a real world experience that occurred outside of the learning environment; and input to a corresponding selectable indicator, which causes the second module to map the time-sensitive data of the real world experience to the corresponding topic in the first template. The learning objectives are augmented to include aspects of the real world experience.

20 Claims, 20 Drawing Sheets

Life Experiences

Monday, August 31, 2015
Going to Peachwave

After dinner, Mom, Dad and I went to Peachwave for frozen yogurt. I started with $20 in my wallet. I got chocolate and vanilla "combo-wambo" with Heath Bar, M&M and whipped cream toppings. This is a special treat because it has dairy [cow's milk] in it.

My treat cost me $3.26. The boy at the register gave me my change of $16.74.

I like to go to Peachwave!

Select Language

Katie Smith

QUICK START GUIDE

BACK

NEW

LOG OUT

700B — All About Others 👁 — Katie Smith

QUICK START GUIDE

BACK

LOG OUT

Date
08/12/2015

My name is
710
[                    ]

These are some of my favorite things

Favorite color
[                    ]

Favorite song
[                    ]

Favorite sport
[                    ]

712
Favorite subject in school
[                    ]

Favorite memory
[                    ]

Where I like to go on vacation
[                    ]

Favorite food
[                    ]

Something else about me
714
[                    ]

Add another item

Add Picture [JPEG, GIF, PNG, # MB MAX]
Choose file
716
Add Attatchment [PDF, Word, EXCEL, # MB MAX]
Choose File

718
Submit

Select Language ▼

All About Others

Katie Smith

QUICK START GUIDE

BACK

LOG OUT

Date
08/12/2015

724 {
I am learning about this person ...

What did I learn?

What things are the same?

I would like to ask this person ...
}

726 — Add another item

728 {
Add Picture [JPEG, GIF, PNG, # MB MAX]
Choose File
Add Attatchment [PDF, Word, EXCEL, # MB MAX]
Choose File
}

| Connect to Learning Plan | Apply |
|---|---|
| Conversation Skills | ✓ |
| Weather Systems | ☐ |
| Mexico | ☐ |
| Colonial America | ☐ |

729

730 — Submit

☐ Select Language ▽

| IEP Management | | | | | | | |
|---|---|---|---|---|---|---|---|
| | Student Setup | X | Settings | X | Reports | X | New Tab |

☐ Data Sets ⟶ Start new data set ⟶ Open data set, populate IEP goals and objectives & Link to topics in the Learning Plan (enter IEP GOAL) —1020
(enter IEP OBJECTIVE) —1022

- - - - - - - - - - - - - - - -

Point to Learning Plan

| Connect to Learning Plan | | Apply |
|---|---|---|
| Currency | Do I have enough to make a purchase? | ✓ |
| Weather Systems | Naming main cloud formations | ☐ |
| Mexico | Typical foods eaten | ☐ |
| Colonial America | Naming New England States | ☐ |

Next
1026

Save and exit

IEP Management

| Student Setup | X | Settings | X | Reports | X | New Tab |

→ Select existing data set → [IEP Data 06/01/15 – 05/31/16]

☐ Select A Topic in the Learning Plan

| Connect to Learning Plan | Apply |
|---|---|
| Currency  Do I have enough to make a purchase? | ✓ |
| Weather Systems  Naming Main Cloud Formations | ☐ |
| Mexico  Typical Foods Eaten | ☐ |
| Colonial America  Naming New England States | ☐ |

↑ 1028

☐ Select IEP GOAL(S) AND OBJECTIVE(S) that you would like to assign to the selected topic in the Learning Plan

| 1.0 | (IEP Goal) | (IEP Objective) | ✓ |
|---|---|---|---|
| 1.1 | (IEP Goal) | (IEP Objective) | ✓ |
| 2.0 | (IEP Goal) | (IEP Objective) | ☐ |
| 3.0 | (IEP Goal) | (IEP Objective) | ✓ |
| 3.1 | (IEP Goal) | (IEP Objective) | ☐ |

↑ 1030

Next

Save and Exit

FIG. 10C

STUDENT-CENTRIC LEARNING TOOL

BACKGROUND

The present invention relates to collaborative education and support, and more specifically, to a student-centric learning tool for communication-challenged students.

The primary goal of educators is to help each student develop the ability to explore, discover, and make lasting connections with the world around them. Traditionally, the home and school operate in parallel with few opportunities or pathways for meaningful communication and individualized collaboration around each student.

There are unique challenges faced by educators of students who have difficulties with communication skills, e.g., students on the Autism Spectrum often experience an inability to express their needs and thoughts. For an educator, it is critical to find ways to effectively engage these students in order to promote learning and social development. Research has shown that drawing upon personal narratives can be a very effective way of connecting with such students. Moreover, learning opportunities are often unpredictable requiring educators and parents to be prepared to react at a moment's notice. Oftentimes, parents at home are not aware of what is happening in the classroom (e.g., learning and social) and students with communication challenges are unable to articulate to the parents the events of their day when returning home from school.

SUMMARY

According to one embodiment of the present invention, a system for student-centric learning is provided. The system includes a computer processor and a plurality of software modules executable by the computer processor. The plurality of software modules include a first software module configured to receive, from a first source via a first template, time-sensitive data about elements of learning objectives with respect to students engaged in a structured learning environment. The elements are exported into a second template of a second software module and are classified by topic. A selectable indicator is provided in the second template and corresponds to each of the topics. The second software module is configured to receive, from a second source via the second template time-sensitive data with respect to a real world experience of the student that occurred outside of the structured learning environment. The real world experience reflects a learning instance. The second software module is also configured to receive input, by the second source, to a corresponding selectable indicator. The input causes the second module to map the time-sensitive data of the real world experience to the corresponding topic in the first template. The learning objectives are augmented to include aspects of the real world experience.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 5A-5B depict user interface screens for accessing features of a Life Experiences module according to an embodiment;

FIGS. 7A-7E depict user interface screens for accessing features of an All About Others module according to an embodiment;

FIGS. 8A-8B depict user interface screens for accessing features of an All About Student module according to an embodiment;

FIGS. 9A-9C depict user interface screens for accessing features of a Daily Log module according to an embodiment; and FIGS. 10A-10C depict user interface screens for importing and integrating data to fulfill required protocols (e.g., government mandated protocols as specified in individualized education plans and other standards) into the student-centric learning system according to an embodiment.

DETAILED DESCRIPTION

Exemplary embodiments facilitate student-centric learning, particularly for communication-challenged individuals. The student-centric learning processes provide timely and consistent information sharing among a student's community which may consist of, but is not limited to, parents, educators, therapists, counselors, and peers. This leads to a more consistent and quicker transition into the learning and social development objectives of the student. As learning opportunities are unpredictable, not having the right connection at the right time could result in a lost learning opportunity. In addition, each student may have individual needs and challenges (e.g., learning styles, social, and emotional). Community members are able to tap into experiences and topics that are within the student's sometimes limited scope or area of interest, as well as limited vocal skills and limited vocabulary. The student-centric learning processes enable the sharing of topics of a curriculum, as well as the individual learning objectives for the student. A parent or other member of community can then create life experiences or reinforce learned concepts outside of school. Likewise, the learning experiences that occur outside of the school (e.g., at home) can be shared and used to augment an existing topic in the curriculum helping to bridge, or generalize, the concepts taught in school to real life. Additionally, the student-centric learning processes allow for connectivity of various communication streams (e.g., learning objectives and life experiences), which can be used as part of a document requirement fulfillment or mandate (e.g., an individualized education plan as well as state and other standards documentation).

It is understood in advance that although this disclosure includes a description of the exemplary embodiments implemented using a client/server model, the implementation of the teachings herein is not limited to client/server architectures, but may be capable of being implemented in conjunction with any type of computing environment. For example, the student-centric learning processes may be implemented in a cloud computing environment.

Figure 1:
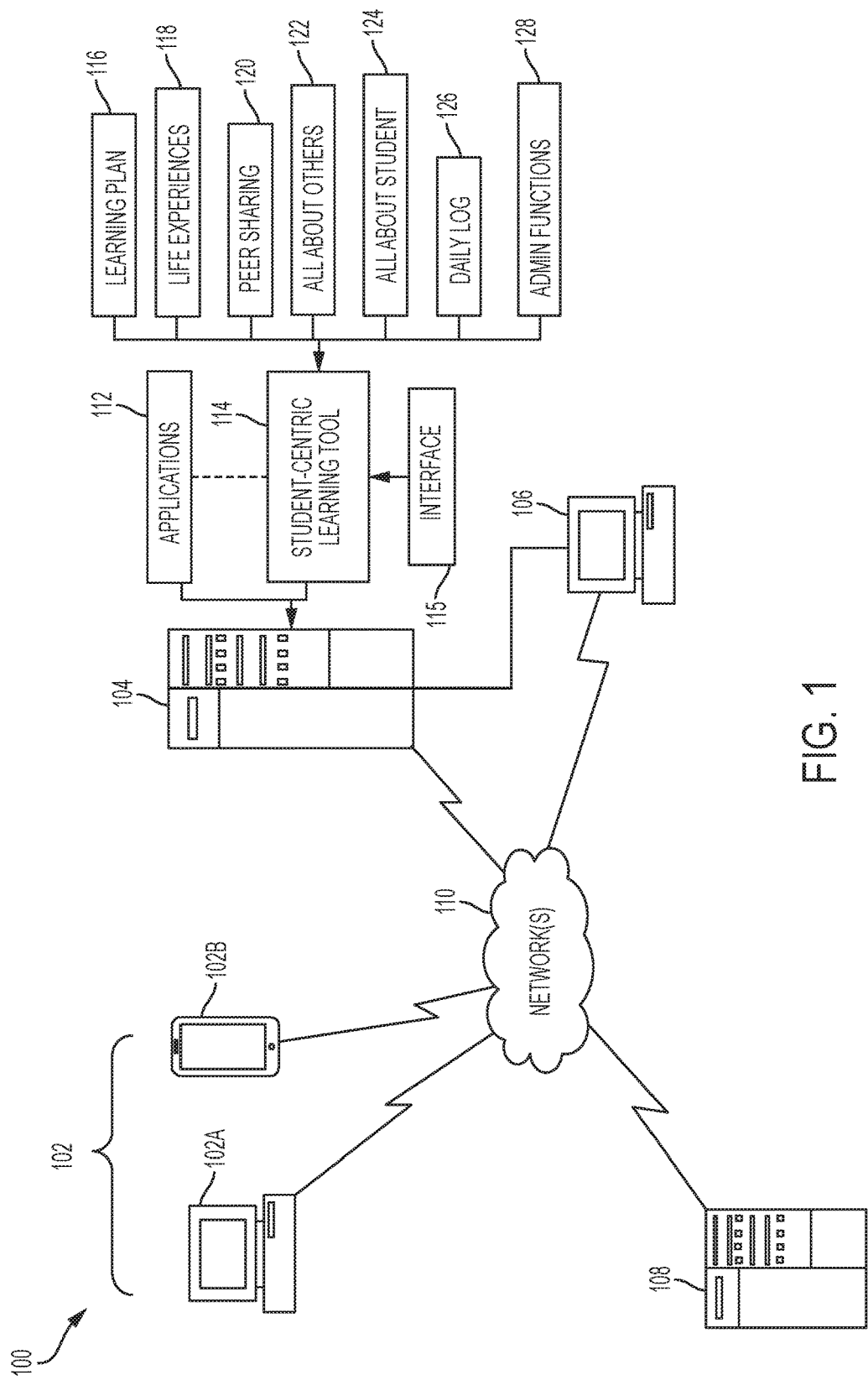
FIG. 1 depicts a system upon which student-centric learning processes may be implemented in accordance with an embodiment of the present invention.

Turning now to FIG. 1, a system 100 upon which the student-centric learning processes may be implemented will now be described in an exemplary embodiment. The system 100 includes client devices (also referred to as user systems) 102A, 102B, and 106, a host system computer 104, and a third-party system computer 108, each of which may be communicatively coupled to one or more networks 110. Collectively, user systems 102A and 102B are referred to as user systems 102.

The host system computer 104 may be implemented as a high-speed computer processing device for handling the volume of activities associated with users of the student-centric learning processes. In an embodiment, the host system computer 104 is operated by an educational institution. In an alternative embodiment, the host system computer 104 may be implemented by an application service provider or other entity that hosts a website for one or more educational systems. In the simplified diagram of FIG. 1, the host system computer 104 is implemented by a school system.

The user systems 102A, 102B and 106 may be operated by end users of the student-centric learning processes described herein. The user systems 102A and 106 may be each implemented as a general-purpose computer (e.g., desktop or laptop), and the user system 102B may be implemented as a mobile device, such as a smart phone, tablet, or personal digital assistant. It will be understood that the user system 106 may be implemented by a mobile device in lieu of a general-purpose computer. While only three user systems 102A, 102B, and 106 are shown in FIG. 1 for ease of illustration, it will be understood that any number of user systems may be employed in order to realize the advantages of the exemplary embodiments. The user systems 102A and 102B represent devices that are operated by individuals associated with students of the school system but who are not employees of the school system. For example, individuals associated with the students who may access features of the student-centric learning system may include parents, relatives, and other authorized individuals. The user system 106 represents a device that is operated by designated representatives of the school system, such as various employees working in different roles who provide services to the students. For example, designated representatives of the school system include educators, therapists, counselors, and medical personnel. As shown in FIG. 1, as an employee of the school system, the user system 106 may be communicatively coupled to the host system computer 104 (e.g., over a wireless local area network of the school system), or may be coupled to the host system computer 104 over one or more networks 110.

The host system computer 104 may also include internal memory for storing documents, policies, individualized education plans (IEPs), student records, and other types of data (including state and other standard data) used in the ordinary course of business. In an alternative embodiment, the host system computer 104 may store data in a separate storage facility (not shown) that is communicatively coupled to the host system computer 104. In addition, the host system computer 104 may store tables and other data sets created and used by the student-centric learning processes described herein.

The networks 110 may be any type of known networks including, but not limited to, a wide area network (WAN), a local area network (LAN), and a global network, and an intranet. The networks 110 may include private networks in which access thereto is restricted to authorized members. Access by authorized user systems through the private network to the host system computer 104 may be segmented and managed according to the nature of information required for each authorized user.

The networks 110 may be implemented using wireless networking technologies or any kind of physical network implementation known in the art. User systems 102 and 106 may be coupled to the host system computer 104 through multiple networks (e.g., Internet, intranet, and private network) so that not all user systems are coupled to the host system computer 104 through the same networks.

The host system computer 104 executes one or more applications 112 in furtherance of its educational purposes. For example, the applications 112 utilized in a school environment may include curriculum-related software such as grading software and grade level courses and associated rubrics. The host system computer 104 may also execute a student-centric learning tool 114 (also referred to herein as "application 114") for implementing the embodiments described herein. In one embodiment, the student-centric application 114 may be integrated with a website of the school system operating the host system computer 104. Users then access the student-centric application 114 features through a website link or option. In an embodiment, the student-centric learning tool 114 may be integrated with one or more of the applications 112 or may be a stand-alone application.

The student-centric learning tool 114 is configured to include various software modules that perform selected functions. As shown in FIG. 1, the modules include, e.g., Learning Plan 116, Life Experiences 118, Peer Sharing 120, All About Others 122, All About Student 124, and Daily Log 126. The modules may be configured as independent components of the application 114, which are configured to manage and control access to features and content based on permissions associated with each module for each community member, as well as transport certain data from each module to designated supporting modules, as will be described further herein. It will be understood that the modules can be offered as a complete set or may be offered individually to participants of the student-centric learning processes.

As shown in FIG. 1, an administrative functions module 128 is included in the student-centric learning application 114. The administrative functions module 128 provides support for features of the modules 116-126. For instance, the administrative functions module 128 may include a content approval function that enables content inputted by certain individuals to be temporarily stored in a location awaiting review and approval by a content reviewer before it is accepted for display by one or more corresponding modules.

The third-party system computer 108 represents a computer system that is managed by a standards based entity, such as an IEP provider, as well as other student information systems. The host system computer 104 is configured with an interface 115 that imports data from the third-party system computer 108 to particular location(s) in various modules as needed.

Figure 2:
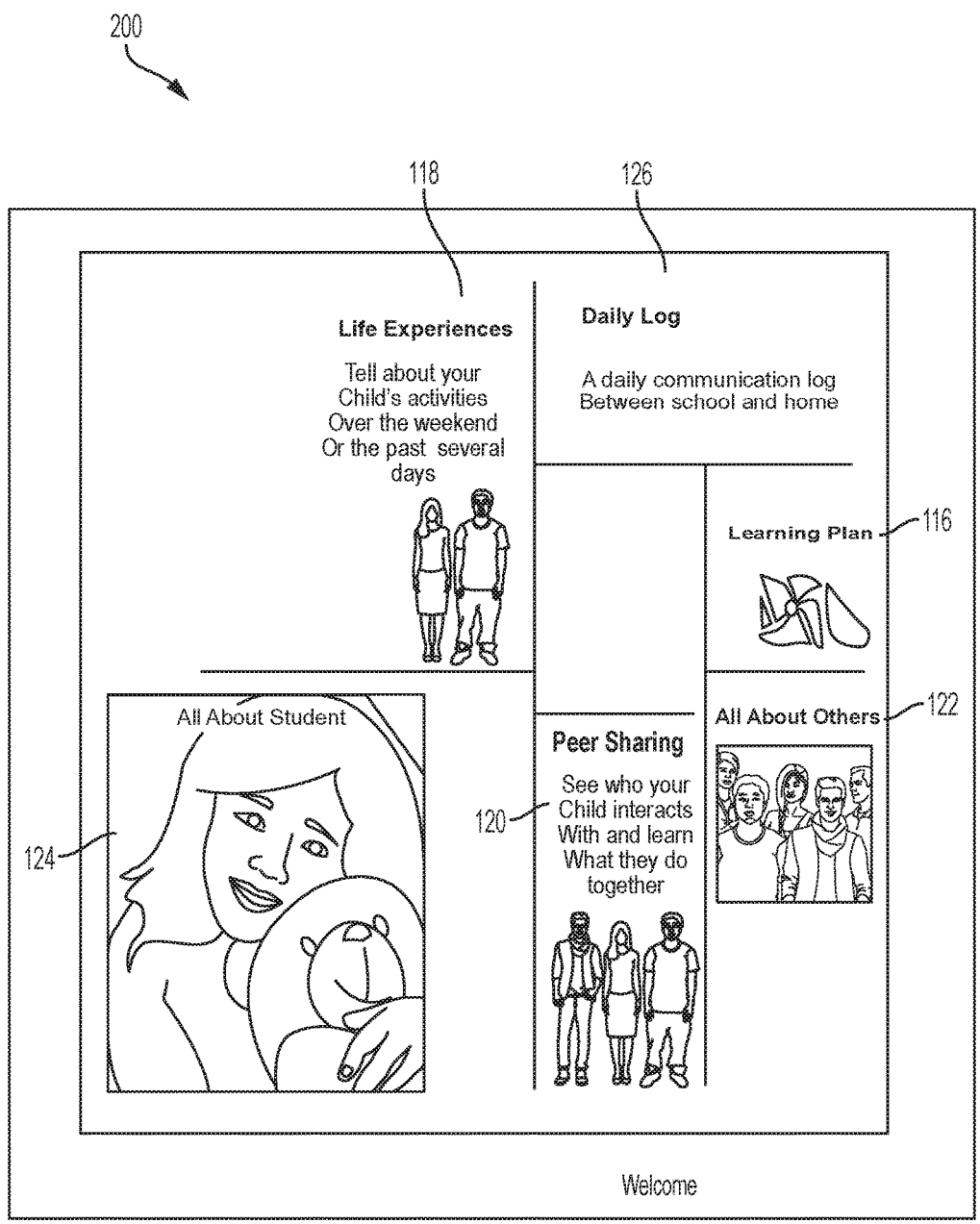
FIG. 2 depicts a main menu screen of selectable modules of the student-centric learning processes in accordance with an embodiment.

As shown in FIG. 2, a main menu screen 200 of the application 114 displays each of the modules 116-126, which may be selectively accessed by users through this individual screen 200 subject to assigned permissions, e.g., through the administrative functions module 128.

Figure 3:
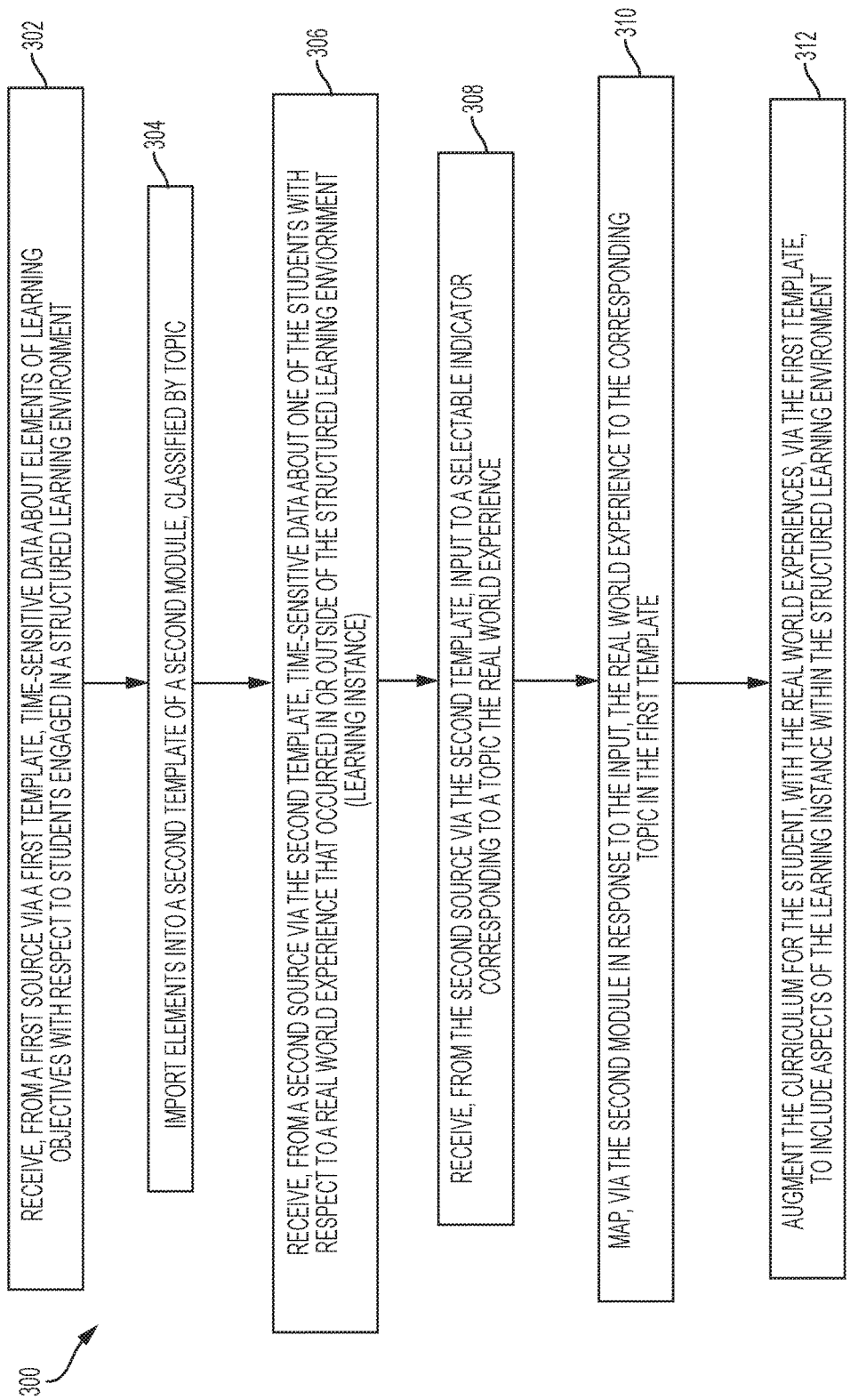
FIG. 3 depicts a flow diagram of a process for implementing a portion of the student-centric learning according to an embodiment of the present invention.
Figure 4:
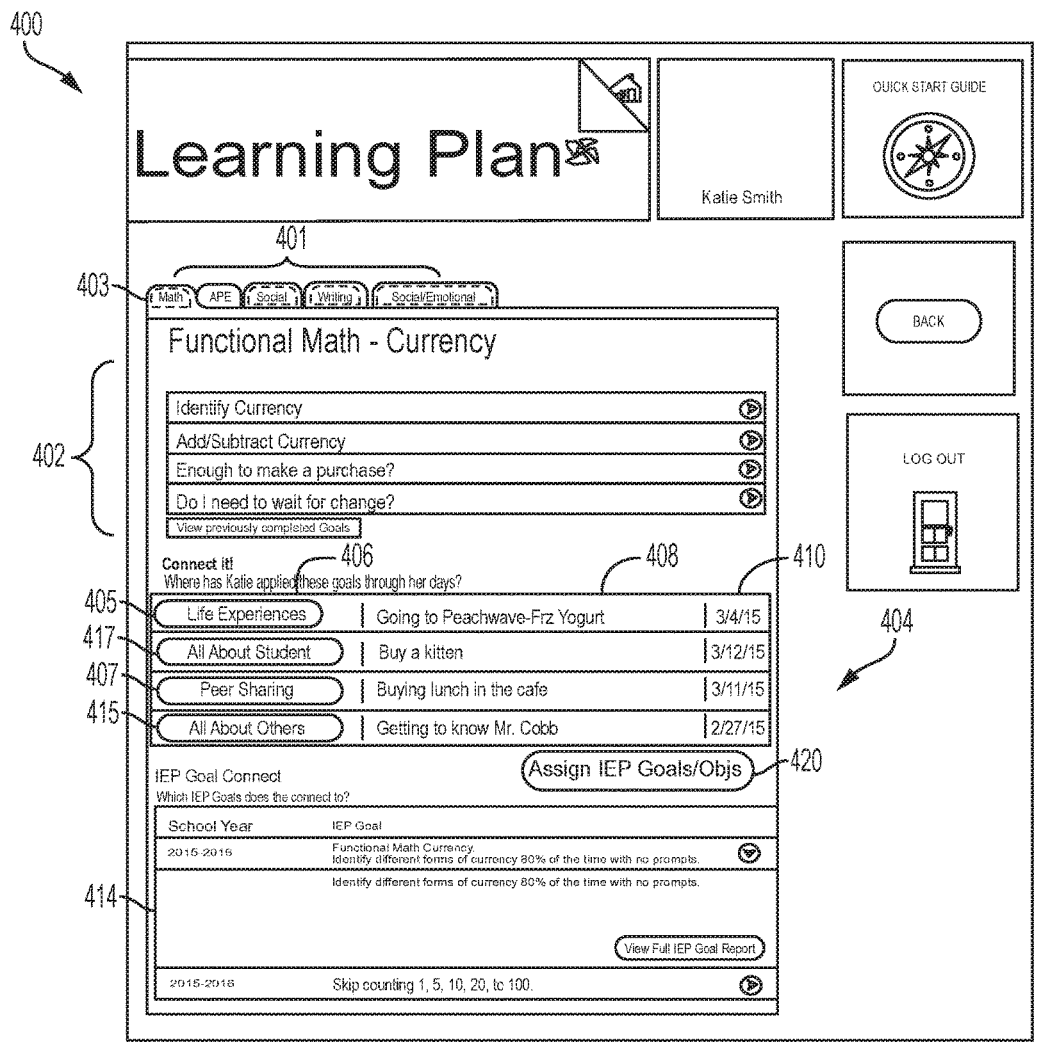
FIG. 4 depicts a user interface screen for accessing features of a Learning Plan module according to an embodiment.

Turning now to FIG. 3, a flow diagram 300 describing a process for implementing a portion of the student-centric learning features will now be described in an embodiment. The process 300 described in FIG. 3 illustrates features offered through the Learning Plan module 116 and the Life Experiences module 118. The Learning Plan module 116 provides a first template for enabling multi-way sharing among appropriate members of a student's community in support of the student's learning objectives. This information helps families reinforce the student's lessons through real-life experiences, increases the student's awareness and helps him or her build connections to the world around him or her. A user interface screen 400 corresponding to the first template is shown in FIG. 4.

Figure 5A:
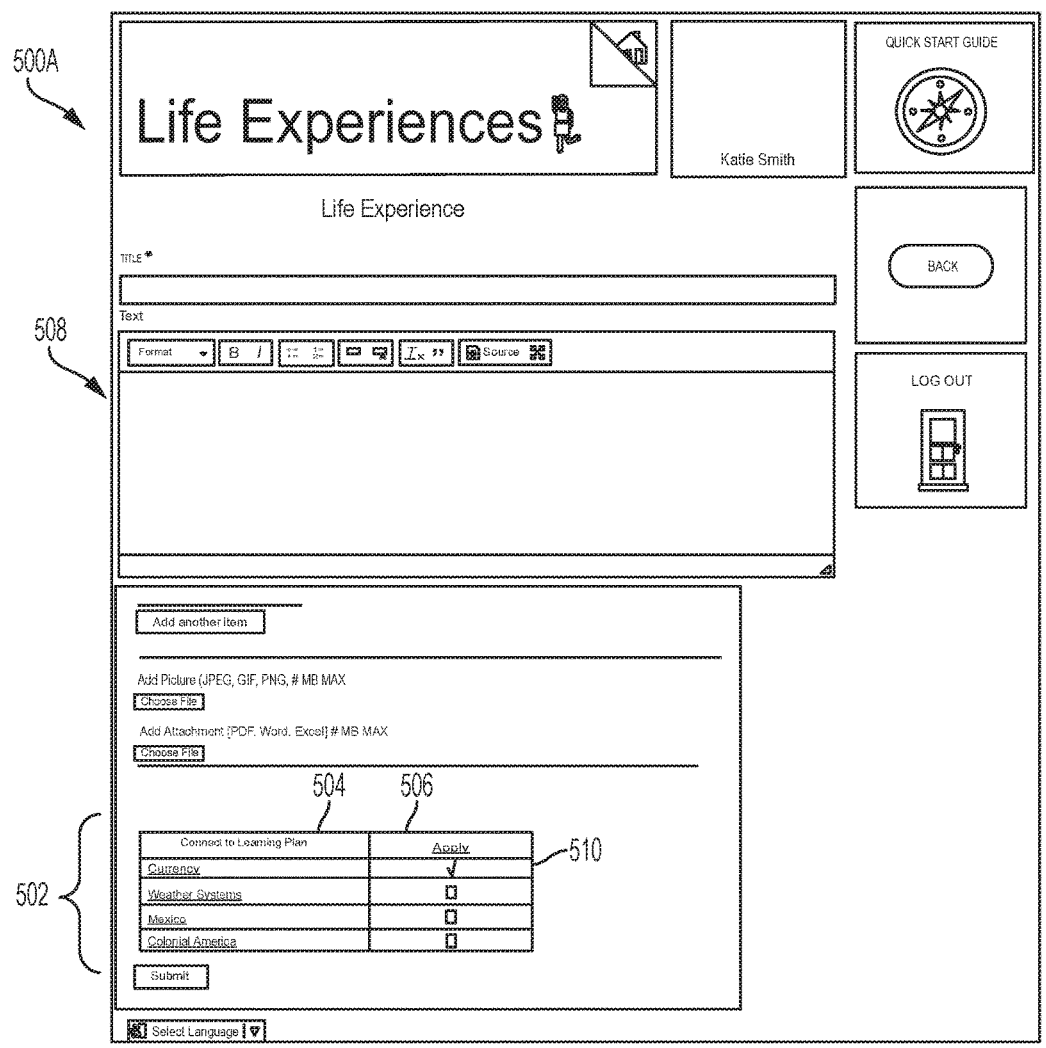

The Life Experiences module 118 provides a second template for delivering regularly updated messages between home and school highlighting the student's activities inside and outside of the school. This module 118 helps prompt conversations between peers as they discover similarities and common interests. Teachers and therapists, as well as other support services personnel, who help the student build vocabulary, language and writing skills can also leverage this information. User interface screens 500A and 500B corresponding to the second template are shown in FIGS. 5A-5B, respectively.

Returning to FIG. 3, in block 302, the host system computer 104 receives time-sensitive data about elements of learning objectives with respect to students engaged in a structured learning environment (e.g., the school system). The time-sensitive data about elements of the learning objectives includes topics of lessons that are actively in process with students or planned in the very near future. For example, topics for a science lesson plan may include cloud formations and weather. This data may be entered by a first source through an automated curriculum software system (e.g., one of applications 112) or may be input directly by an educator or other professional affiliated with the school system. As shown in FIG. 4, tabs 401 list subjects of a curriculum. Specific topics currently in process for the student with respect to a selected subject 403 are entered and shown in section 402.

In block 304, the elements input by the first source are exported into the second template of the Life Experiences module 118 and are classified by topic. The second template includes a selectable indicator that corresponds to each of the topics. As shown in FIG. 5A, a table 502 includes the elements by topic in column 504. A selectable indicator for each topic is shown in column 506.

In block 306, the second template receives from a second source time-sensitive data with respect to a real world experience of the student that occurred within or outside of the structured learning environment. The real world experience reflects a learning instance. The second source may be a family member, guardian, or relative of the student who documents details of the real world experience in the second template. In another embodiment, the second source may be an educator or agent of the school who would like to share an experience that occurred at school. In FIG. 5A, a parent may share a real life experience in a text window 508. The information shared by the parent in text window 508 can then be displayed in a window 520 of user interface screen 500B of FIG. 5B. For purposes of illustration, a parent has entered an experience that relates to currency, which is shown in FIG. 5B.

In block 308, the second template also receives a selection by the second source of a corresponding selectable indicator (column 506). The second source may select an indicator corresponding to an active topic (column 504) in the curriculum, whereby aspects of the real world experience are related to the active topic. As shown in FIG. 5A, a parent selects an indicator 510 for the topic "Currency," which is the topic, or related to the topic, of the real world experience. The selection of the selectable indicator causes the Life Experiences module 118 to map the time-sensitive data of the real world experience to the corresponding topic in the first template in block 310. The learning objectives are augmented to include aspects of the real world experience in block 312. While in a structured learning environment an educator can access, through the Learning Plan module 116, documentation of the real world experiences, shared in the Life Experiences module 118, that can be attributed to the topics being taught and can prompt a student using his/her own life experience and will allow the student to connect concepts being taught to real life experiences.

As shown in FIG. 4, a table 404 identifies information sharing and inputs from individuals, such as parents, student peers, and community members. The table 404 includes a listing of the modules from which the information has been shared (column 406), the topic of the information shared (column 408), and a date in which the information has been shared (column 410). As can be seen in the table 404, the input from the parent via the Life Experiences module 118 is displayed in a line entry 405.

Figure 6A:
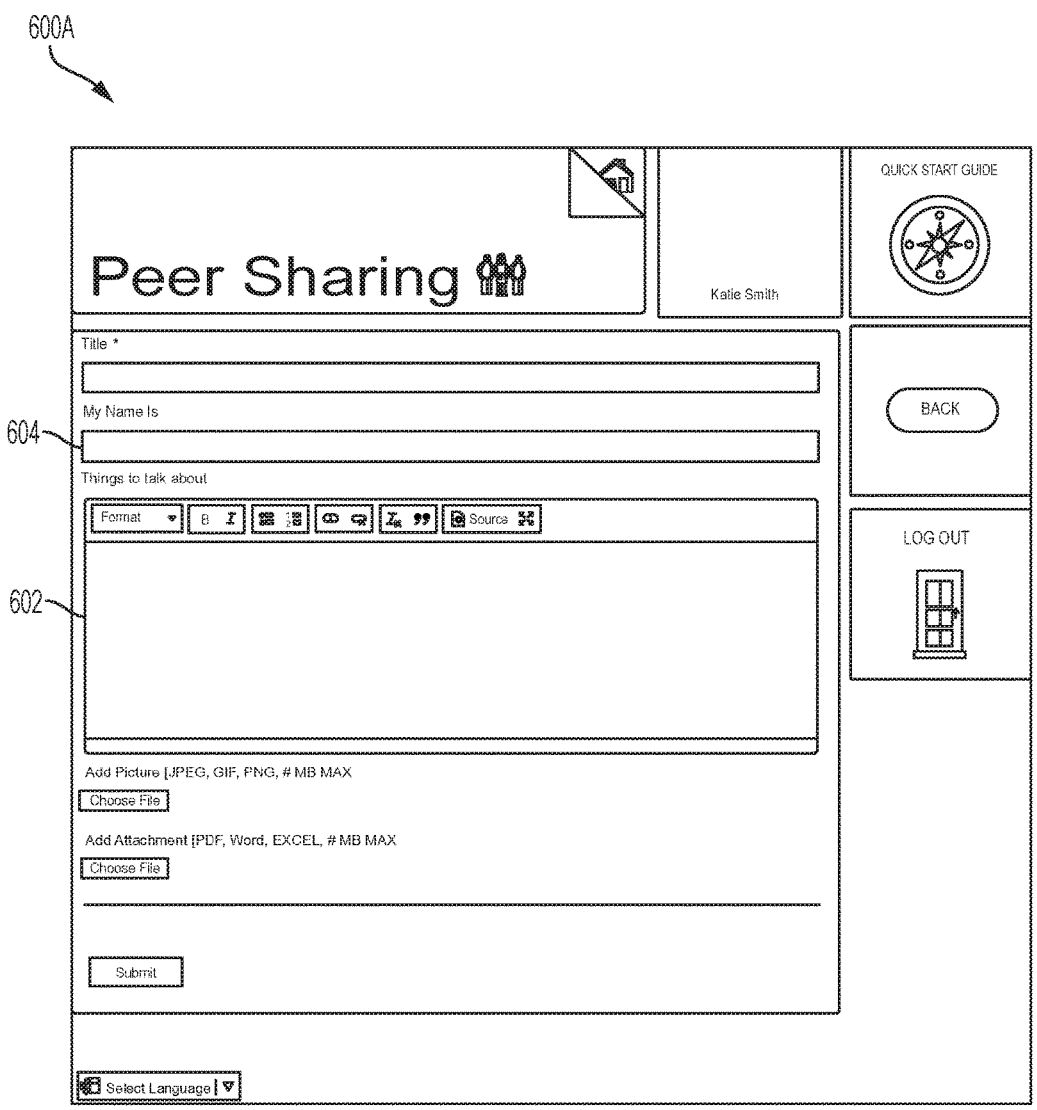
FIGS. 6A-6B depict user interface screens for accessing features of a Peer Sharing module according to an embodiment.
Figure 6B:
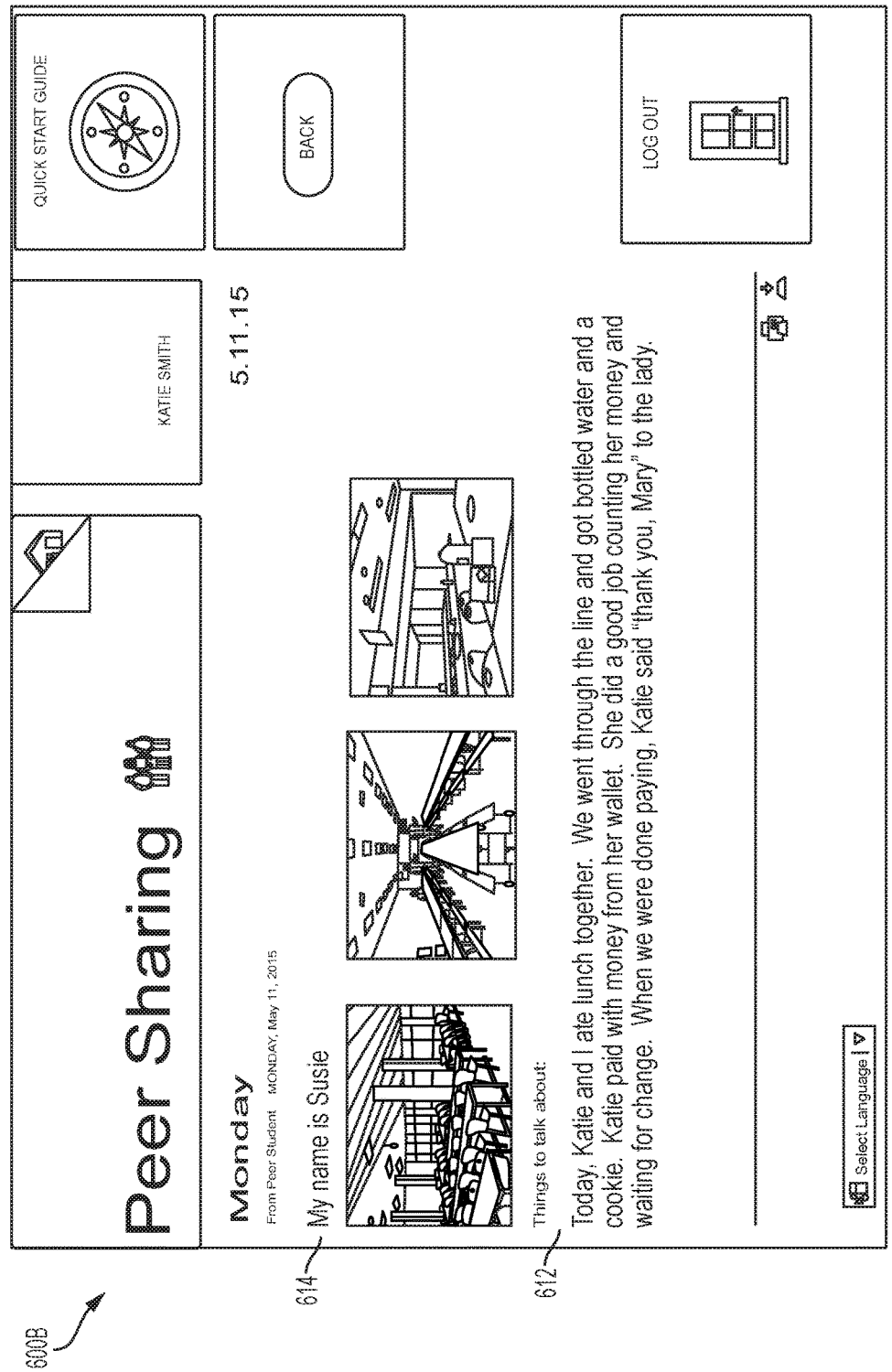

In addition to the features offered by the Learning Plan module 116 and the Life Experiences module 118, other modules can be accessed to provide additional features. For instance, the Peer Sharing module 120 provides a third template that enables the student and his/her peers to input comments and observations about events that occur in the school environment. The Peer Sharing module 120 includes a separate webpage or screen for each student and comments entered by students, e.g., relating to a student, are processed and posted on that student's own webpage. A user interface screen 600A corresponding to the third template is shown in FIG. 6A. The comments and observations input through this module 120 can be accessed by the parents or guardian of the student, and other members of the community who are granted permission. As shown in FIG. 6A, user interface screen 600A includes a text window 602 that enable a student peer to enter and share stories that will be accessible to the student. Each text window 602 includes an identifier 604 of the student posting the information. The student-centric learning processes provide a filtering mechanism by which, e.g., an educator or other authorized individual (or alternatively, an automated filtering software tool), receives the inputted information and may review the information before posting. The educator, e.g., may allow the information to be posted to the first template shown in FIG. 4, or may reject the information. The educator may also edit the information before posting if desired. In FIG. 6B, output of the data entered in FIG. 6A is illustrated in user interface screen 600B. As shown in FIG. 6B, the individual (field 604) who entered the information in FIG. 6A is shown in field 614, while the content (field 602) entered in FIG. 6A is shown in field 612 of FIG. 6B.

In addition, the comments and observations entered via the third template can be linked by the Learning Plan module 116, as a supplemental topic, between the third template and the first template. Upon selection of the link to the supplemental topic within the Learning Plan module 116, the Learning Plan module 116 retrieves the content from the content approval function/location and displays it on a device (e.g., one of the user systems). The supplemental topic may include at least a portion of the input of the comments and observations, and the learning objectives can be reinforced using the supplemental topic. As shown in FIG. 4, e.g., a line item 407 illustrates a line entry that corresponds to input received via the Peer Sharing module 120.

Another feature offered by the student-centric processes is provided through the All About Others module 122. This module is accessed through user interface screen 700A (FIG. 7A) and a community member can create a profile through option 702, or a story through option 704 which provides a fourth template for enabling others, such as members of the student's community, to share their stories and interests. Support services personnel, such as therapists, can guide the student in exploring a broader range of topics and create a safe environment to explore similarities and differences and to practice who, what, where, and when conversation skills with others. Community members may provide a supporting role to the student, such as neighbors, mentors, and others.

Figure 7A:
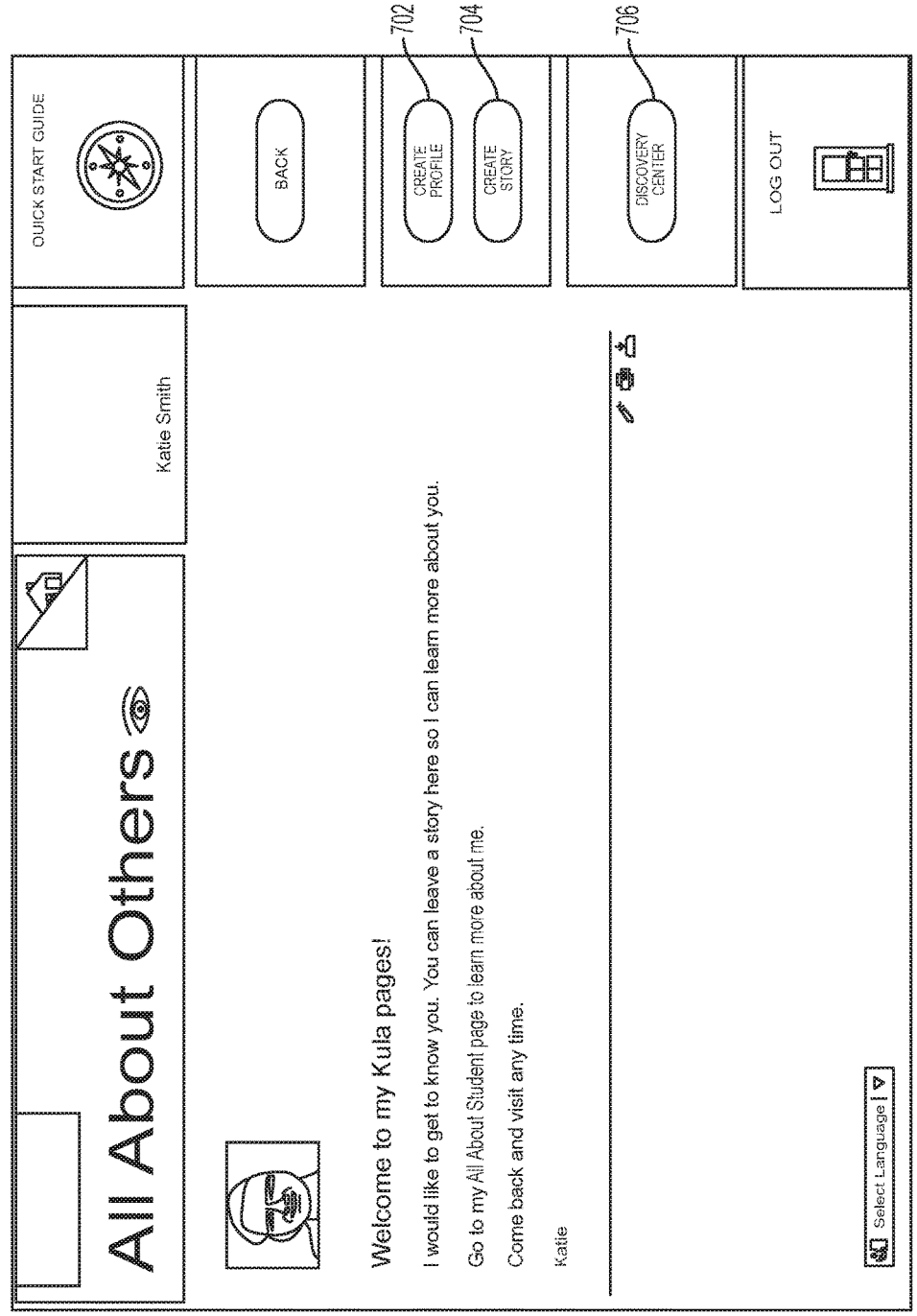
Figure 7C:
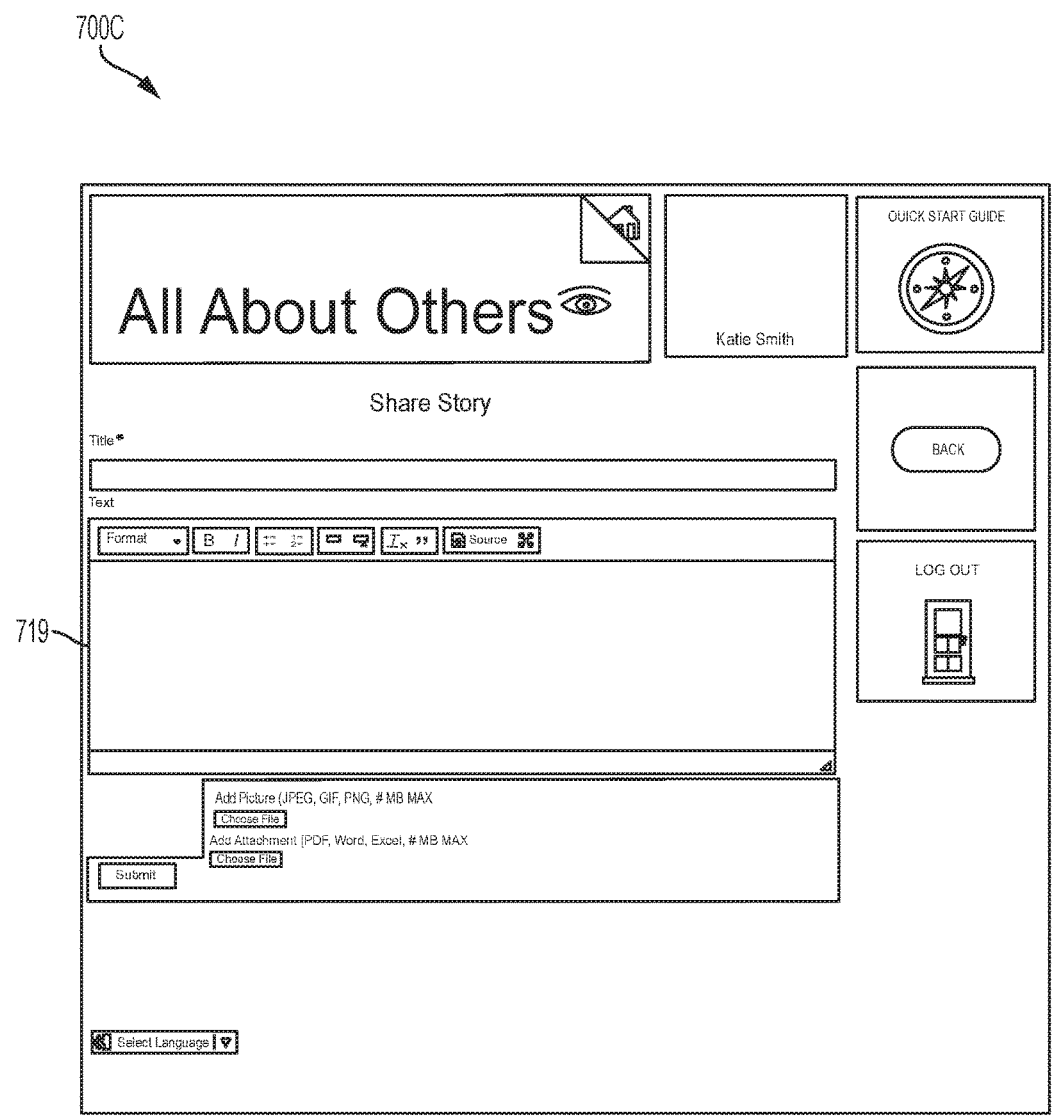

Members of the community may access the All About Others module 122 and enter profile information or a story about themselves. The host system computer 104 receives the profile information or story via the fourth template from a community member. The data entered through the All About Others module 122 can be accessed by the student and a team member who is tasked with providing a support service. In an embodiment, the support service may be in furtherance of goals and objectives of an IEP or other standardized plan created for the student. Examples of team members may include therapists, counselors, and medical personnel. As shown in FIG. 7A, a user interface screen 700A illustrates a main page for a particular student that is accessed by the community member. While working with a student the team member providing support service can select option 706 which relates to a Discovery Center. When accessed, the option 706 enables completed profiles and stories created by others to be viewed in FIG. 7D. In addition, the Discovery Center provides a fifth template which may used by the team member providing support services to the student to prompt data gathering about what the student is learning about others, draw similarities and differences and practice who, what, where, and why conversation skills.

Figure 7D:
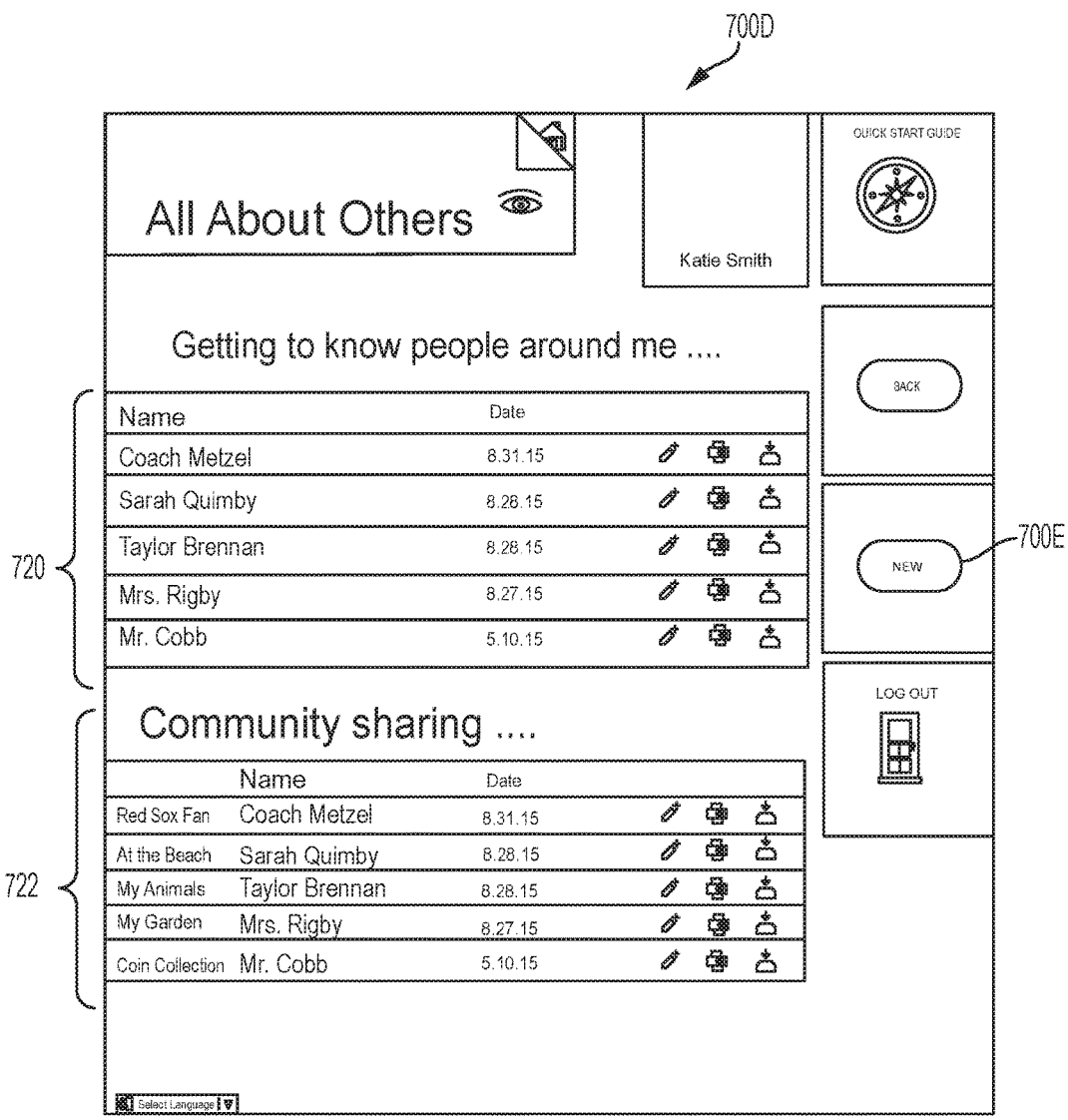

The profile information page (upon selecting the option 702) is shown in FIG. 7B. As shown in FIG. 7B a user interface screen 700B includes a field 710 for the community member's name, followed by fields 712 that ask for specific interests of the member. In field 714, the member can enter anything else not addressed in fields 712. In addition, the member may upload or attach a picture or other file through option 716. Upon completion, the member selects a submit option 718. Once the community member has entered a profile or shared a story, this information is collected and presented in a list, as shown in FIG. 7D. A support service individual, such as a therapist or counselor can access this information through user interface screen 700D. As shown in FIG. 7D, a list of individuals (community members) who have submitted profiles is shown in section 720, and a list of individuals (community members) who have submitted stories is shown in section 722.

In an embodiment, the fifth template provides directed prompts for receiving responses from the student. The directed prompts are configured to acquire qualitative measurements of student comprehension of the profile data and identify opportunities of future learning. For instance, a directed prompt may ask for commonly shared characteristics between the community member and the student. For instance, a therapist or counselor accesses a profile (e.g., from section 720 in FIG. 7D) and discusses the entries submitted by the member with the student. The therapist is guided with directed prompts to gather information from the student to foster the student's understanding of the information in the profile. As shown in a user interface screen 700E of FIG. 7E, the therapist or counselor can input responses from the student in fields 724. Other responses can be entered via field 726. In addition, a picture or file can be attached through field 728.

The Learning Plan module 116 is configured to link the student responses entered into the All About Others module 122, as a supplemental topic, with the first template of FIG. 4. This function is facilitated through selection of an item in table 729 of FIG. 7E which identifies a topic in the learning objectives that is related to the student responses. The therapist or counselor selects a Submit option 730 when completed.

Upon selection of a link to the supplemental topic via the first template, the Learning Plan module 116 retrieves the student responses from the fifth template (e.g., by selecting entry 415) and displays the student responses on a display device. The goals and objectives of the student's IEP or other standards-based data are reinforced through the supplemental topic.

In an embodiment, the IEP, as well as state and other standard, data may be loaded by the Learning Plan module 116 via interface 115 from the third-party computer system 108 over the networks 110. The IEP, as well as state and other standard data may then be populated into a table 414 in the Learning Plan module 116. These features are shown and described in FIGS. 10A-10C.

Figures 8A, 8B:
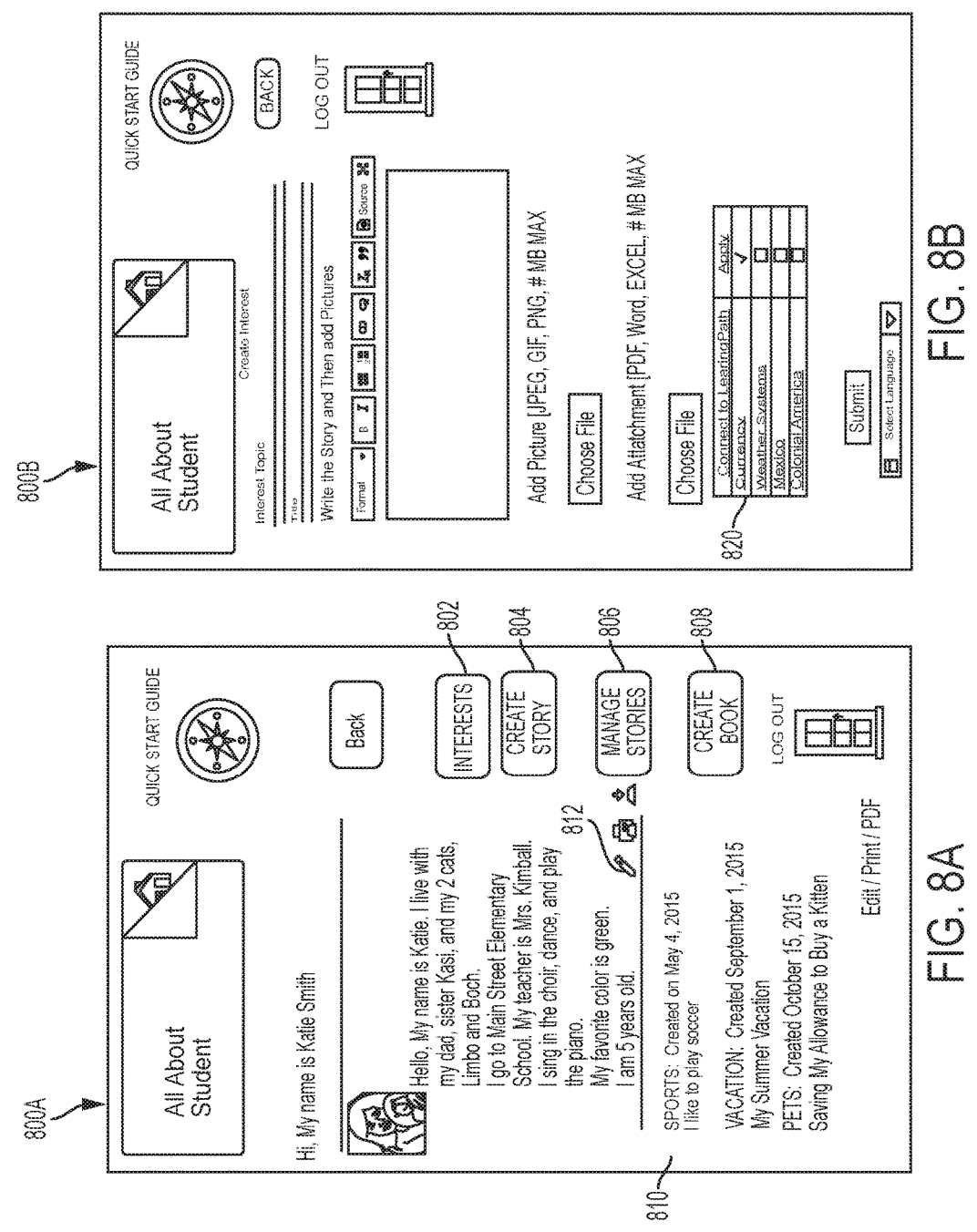

The All About Student module 124 enables the student (or others on behalf of the student) to provide personal information about him or herself, which can be accessed by others (e.g., student peers, educators, support service personnel) to acquire additional information about the student that may assist them in providing support services to the student. The All About Student module 124 provides a sixth template for entering this information. User interface screens 800A-800B corresponding to the sixth template are shown in FIGS. 8A-8B, respectively. As shown in FIG. 8A, the student is presented with several options 802-808 for providing this information. By selecting Interests button 802, the user is brought to a screen (not shown) that allows the user to sort topics/stories by interest (e.g., vacations, family, sports, etc.). This allows users to sort and narrow in on topics that are of interest to him/her. When a user selects the Create Story button 804, he/she is brought to a story input screen (shown in FIG. 8B). Content entered and submitted in this template 800B is then shown at the bottom 810 of the All About Student screen in FIG. 8A. Submitted content is also accessed through the Manage Stories button 806. The student profile ("Hello, My name is Katie . . . ") is accessed via a pencil icon 812 just below that section. Once this pencil icon 812 is selected, the user is brought to an input template (not shown) where text and photos can be added.

In FIG. 8B, once the interest and/or story has been entered, the student or a representative of the student can link the content to the first template of FIG. 4 by selecting a corresponding topic in a table 820 in FIG. 8B. A line entry 417 in FIG. 4 corresponds to the content entered in FIG. 8B.

The Daily Log module 126 provides a seventh (FIG. 9B) and eighth (FIG. 9C) template for enabling the sharing of information among the parent/home and the school. The template provides a single location through which multi-way communications of timely and relevant information about the student can be conveyed. User interface screens 900A-900C corresponding to the seventh and eighth templates are shown in FIGS. 9A-9C, respectively.

Figure 9A:
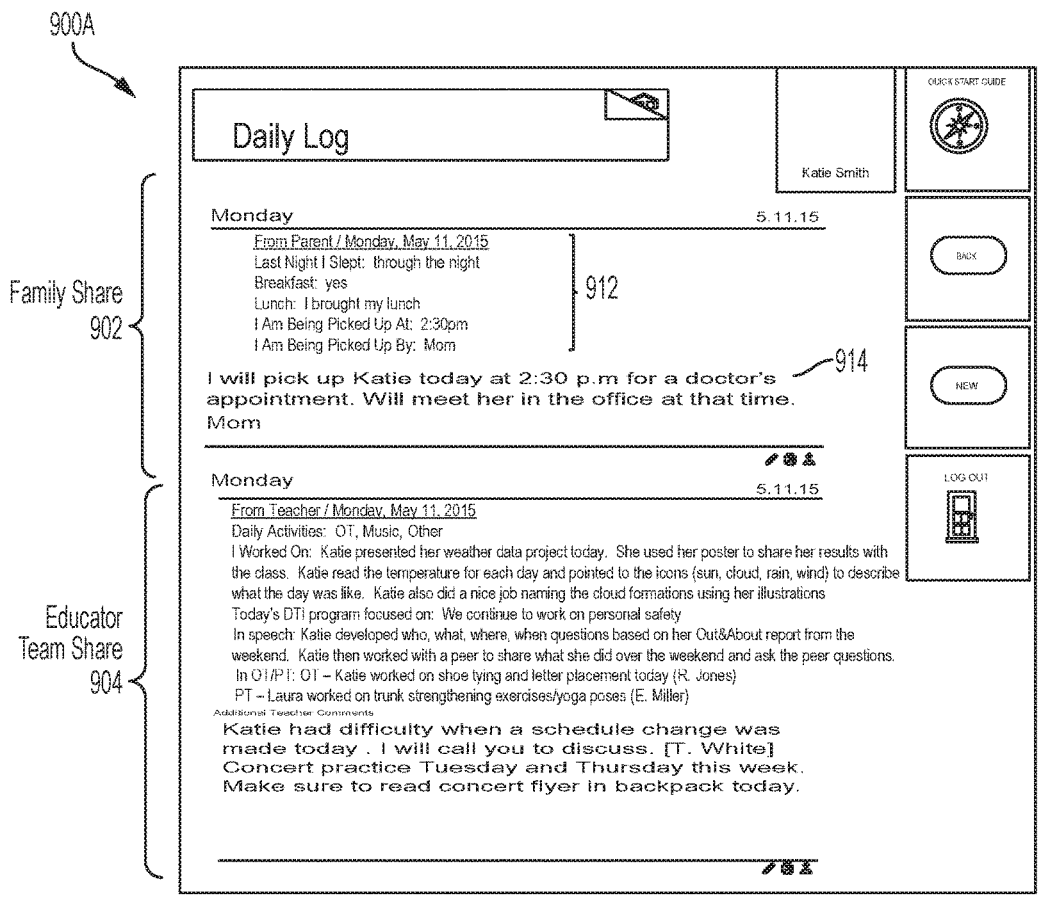
Figure 9B:
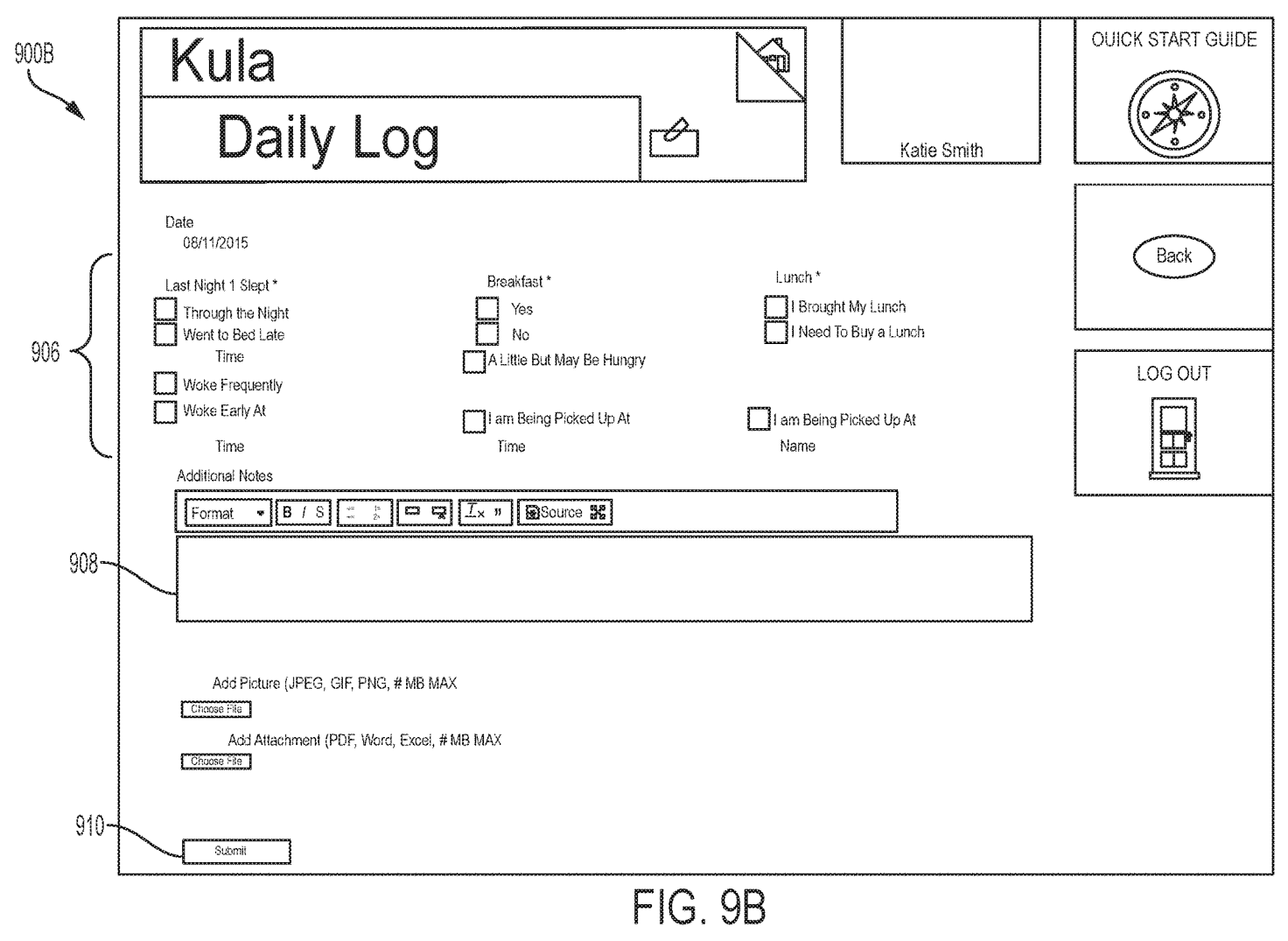
Figure 9C:
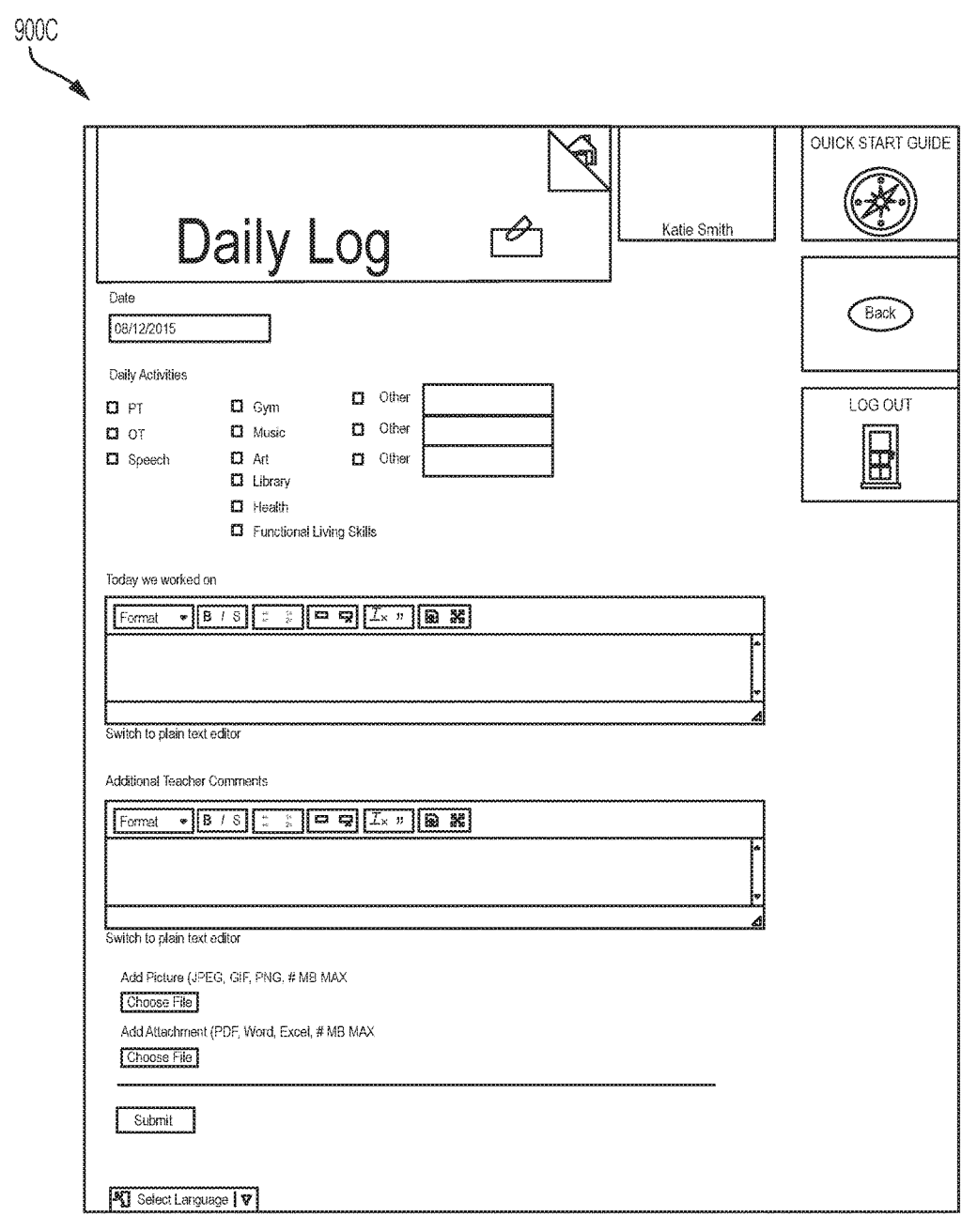

As shown in FIG. 9A, a user interface screen 900A includes a section 902 that illustrates sample information that has been entered by a parent of the student and a section 904 that illustrates sample information that was entered by an educator of the student. A user interface screen 900B in FIG. 9B includes preformatted data fields 906 that enable the parent to share specific information about the student that can be helpful to the educator, such as the student's sleep patterns and eating patterns. In section 908 of FIG. 9B, the parent can enter free text messages and information. Once entered, the parent selects a submit option 910, and the information entered is presented for viewing via the user interface screen 900A (FIG. 9A) (at 912 and 914, respectively).

A user interface screen 900C illustrates sections that can be used by different education professionals to input information about the student's progress in different areas. Once entered, the information can be viewed in the user interface screen 900A at 904.

Figure 10A:
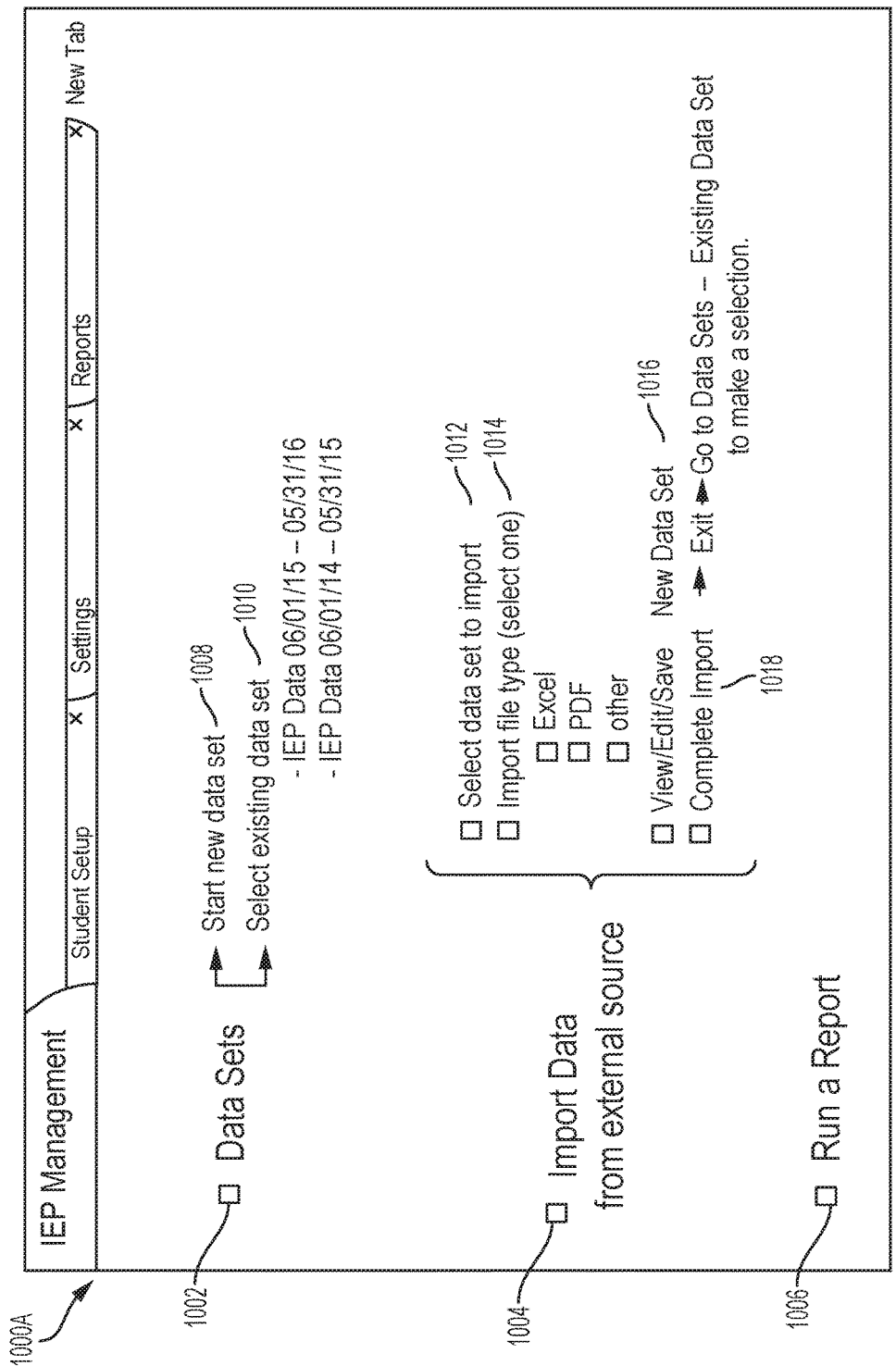

As indicated above, the student-centric learning processes include an interface 115 to import individualized education plans or other standards-based data from a third-party computer system, such as system 108, and populate the corresponding data into one or more data tables, such as table 414 of the first template. Turning now to FIGS. 10A-10C, user interface screens 1000A-1000C will now be described.

As shown in user interface screen 1000A, a user may select from three options, Data Sets 1002, Import External Source Data 1004, and Run a Report 1006.

The option, data sets 1002, includes two functions; 1) Create new data sets 1008, and 2) Select existing data sets 1010. If the user selects Create new data set 1008, the user is guided to proceed to the user interface screen 1000B. If the user selects existing data set 1010, the user is guided to proceed to the user interface screen 1000C.

In user interface screen 1000B, the user enters an IEP goal 1020 and/or objective 1022. Once entered, the user can select a particular topic in data set 1024, that corresponds to a topic in the table 402 in FIG. 4, and the entered goal and/or objective is populated in the table 414. If another goal or objective is to be entered, the user selects option 1026 and repeats the process.

In 1000C, data sets that have been retrieved via the import utility can then be mapped via the user interface 115, and saved into new data sets. The user interface (table 414 in FIG. 4) reflects the assignment of IEP goals/objectives (tables 1028 and 1030) to lessons in the Learning Plan module 116. Additionally, tables 1028 and 1030 can be accessed through FIG. 4 by selecting option 420, which will then allow the assigning of IEP goal/objectives to lessons in the Learning Plan module 116.

Turning back to FIG. 10A, in user interface screen 1000A, the user can select option 1004 to import IEP data from the third party computer system 1008 via the interface 115. The user identifies a file name 1012. The data can be viewed in a staging area 1016. If the user chooses to import the data, the user can name the "new data set" 1016 and complete the import and exit 1018.

Time-sensitive can mean a multitude of things to many people. In reference to student-centric learning tool 114 the definition is when a student is present with another member of his/her community. Learning opportunities are often unpredictable requiring educators and parents to be prepared to react at a moment's notice to not just the physical presence of a student, but when the student has the appropriate emotional state to allow learning and development.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for student-centric learning, the system comprising:
    a first software module at a host computing device configured to receive, via a first template, time-sensitive lesson data describing a learning objective of each of a plurality of students engaged in a structured learning environment, wherein the lesson data is exported into a second template of a second software module at a client computing device and classified by topic;
    a plurality of selectable indicators in the second template, each selectable indicator associated with a corresponding topic;
    wherein the second software module at the client computing device is configured to receive, via the second template:
        time-sensitive real-world data describing one or more lessons of a student of the plurality of students with respect to a real world experience of the student that occurred outside of the structured learning environment, the real world experience reflecting a learning instance; and
        a selection, at the second software module at the client computing device, of a selectable indicator of the plurality of selectable indicators, wherein the selection causes the second software module to map the time-sensitive real-world data of the real world experience to the topic corresponding to the selectable indicator in the first template;
    wherein the learning objective of the student is augmented based on the real-world data to include aspects of the real world experience;
    wherein the first software module at the host computer system is configured to import, from a third software module at a third-party computing device, standards data describing one or more standards for the learning objectives.

2. The system of claim 1, further comprising a fourth software module configured to:
    receive, from at least one of the student and a student peer via a third template, input of comments and observations relating to events occurring within the structured learning environment; and
    provide access to the comments and observations via the third template to the student and the second source.

3. The system of claim 2, wherein the first software module is configured to communicatively link content, as a supplemental topic, from the third template to the first template, and upon selection of a link to the supplemental topic, the first software module is configured to access the content from the third template and display the content on a display device, wherein the supplemental topic includes at least a portion of the input of the comments and observations, wherein the learning objectives are reinforced with the supplemental topic.

4. The system of claim 1, further comprising a fourth software module configured to:
receive profile data, from members of a community who support the student, via a fourth template, the profile data describing personal aspects of the members;
provide access to the profile data via the fourth template to the student and a team member tasked with providing a support service to the student as part of an individualized education plan; and
provide, via a fifth template, directed prompts for receiving student responses to the profile data, the directed prompts configured to acquire qualitative measurements of student comprehension of the profile data and identify opportunities of future learning.

5. The system of claim 4, wherein the first software module is configured to communicatively link the student responses, as a supplemental topic, from the fifth template to the first template, and upon selection of a link to the supplemental topic, the first software module is configured to access the student responses from the fifth template and display the profile data and the responses on a display device, wherein goals and objectives of the individualized education plan are reinforced through the supplemental topic.

6. The system of claim 1, further comprising an interface to an individualized education plan system, wherein the first software module is configured to load individualized education plan data from the individualized education plan system and populate the individualized education plan data into a table in the first template.

7. The system of claim 1, further comprising a computer processor configured to assign and enforce permissions-based access and content approval to the plurality of software modules.

8. A method for facilitating student-centric learning, the method comprising:
receiving, via a first template of a first software module at a host computing device, time-sensitive lesson data describing a learning objective of each of a plurality of students engaged in a structured learning environment, wherein the lesson data is exported into a second template of a second software module at a client computing device and classified by topic;
receiving, via a second template, the second template comprising a plurality of selectable indicators, each selectable indicator associated with a corresponding topic:
time-sensitive real-world data describing one or more lessons of a student of the plurality of students with respect to a real world experience of the student that occurred outside of the structured learning environment, the real world experience reflecting a learning instance; and
a selection, at the second software module at the client computing device, of a selectable indicator of the plurality of selectable indicators, wherein the selection causes the second software module to map the time-sensitive real-world data of the real world experience to the topic corresponding to the selectable indicator in the first template;
wherein the learning objective of the student is augmented based on the real-world data to include aspects of the real world experience;
wherein the first software module at the host computer system is configured to import, from a third software module at a third-party computing device, standards data describing one or more standards for the learning objectives.

9. The method of claim 8, further comprising:
receiving, from at least one of the student and a student peer via a third template of a fourth software module, input of comments and observations relating to events occurring within the structured learning environment; and
providing access to the comments and observations via the third template to the student and the second source.

10. The method of claim 9, further comprising:
communicatively linking content, via the first software module as a supplemental topic, from the third template to the first template, and upon selection of a link to the supplemental topic:
retrieving, via the first software module, the content from the third template; and
displaying the content on a display device, wherein the supplemental topic includes at least a portion of the input of the comments and observations, and wherein the learning objectives are reinforced with the supplemental topic.

11. The method of claim 8, further comprising:
receiving profile data, via a fourth template of a fourth software module, from members of a community who support the student, the profile data describing personal aspects of the members;
providing access to the profile data via the fourth template to the student and a team member tasked with providing a support service to the student as part of an individualized education plan; and
providing, via a fifth template, directed prompts for receiving student responses to the profile data, the directed prompts configured to acquire qualitative measurements of student comprehension of the profile data and identify opportunities of future learning.

12. The method of claim 11, further comprising:
communicatively linking, via the first software module, the profile data and the student responses, as a supplemental topic, from the fifth template to the first template, and upon selection of a link to the supplemental topic:
accessing, via the first software module, the profile data and the student responses from the fifth template; and
displaying the profile data and the student responses on a display device, wherein goals and objectives of the individualized education plan are reinforced through the supplemental topic.

13. The method of claim 8, further comprising:
loading individualized education plan data by the first software module via an interface to an individualized education plan system over a network; and
populating the individualized education plan data into a table in the first template.

14. A computer program product for facilitating student-centric learning, the computer program product comprising a non-transitory computer-readable storage medium having instructions embodied thereon, which when executed by a computer processor, cause the computer processor to implement a method, the method comprising:

receiving, via a first template of a first software module of a host computing device, time-sensitive lesson data describing a learning objective of each of a plurality of students engaged in a structured learning environment, wherein the lesson data is exported into a second template of a second software module at a client computing device and classified by topic;

receiving, via a second template, the second template comprising a plurality of selectable indicators, each selectable indicator associated with a corresponding topic:
- time-sensitive real-world data describing one or more lessons of a student of the plurality of students with respect to a real world experience of the student that occurred outside of the structured learning environment, the real world experience reflecting a learning instance; and
- a selection, at the second software module at the client computing device, of a selectable indicator of the plurality of selectable indicators, wherein the selection causes the second software module to map time-sensitive real-world data of the real world experience to the topic corresponding to the selectable indicator in the first template;
- wherein the learning objective of the student is augmented based on the real-world data to include aspects of the real world experience;
- wherein the first software module at the host computer system is configured to import, from a third software module at a third-party computing device, standards data describing one or more standards for the learning objectives.

15. The computer program product of claim 14, wherein the instructions further cause the computer processor to implement:
- receiving, from at least one of the student and a student peer via a third template of a fourth software module, input of comments and observations relating to events occurring within the standardized learning environment; and
- providing access to the comments and observations via the third template to the student and the second source.

16. The computer program product of claim 15, wherein the instructions further cause the computer processor to implement:
- communicatively linking content, via the first software module as a supplemental topic, from the third template to the first template, and upon selection of a link to the supplemental topic:
- retrieving, via the first software module, the content from the third template; and
- displaying the content on a display device, wherein the supplemental topic includes at least a portion of the input of the comments and observations, and wherein the learning objectives are reinforced with the supplemental topic.

17. The computer program product of claim 14, wherein the instructions further cause the computer processor to implement:
- receiving profile data, via a fourth template of a fourth software module, from members of a community who support the student, the profile data describing personal aspects of the members;
- providing access to the profile data via the fourth template to the student and a team member tasked with providing a support service to the student as part of an individualized education plan; and
- providing, via a fifth template, directed prompts for receiving student responses to the profile data, the directed prompts configured to acquire qualitative measurements of student comprehension of the profile data and identify opportunities of future learning.

18. The computer program product of claim 17, wherein the instructions further cause the computer processor to implement:
- communicatively linking, via the first software module, the profile data and the student responses, as a supplemental topic, from the fifth template to the first template, and upon selection of a link to the supplemental topic:
- accessing, via the first module, the student responses from the fifth template; and
- displaying the student responses on a display device, wherein goals and objectives of the individualized education plan are reinforced through the supplemental topic.

19. The computer program product of claim 14, wherein the instructions further cause the computer processor to implement:
- loading individualized education plan data by the first module via an interface to an individualized education plan system; and
- populating the individualized education plan data into a table in the first template.

20. The computer program product of claim 14, wherein the instructions further cause the computer processor to assign and enforce permissions-based access and content approval to the plurality of software modules.

* * * * *